(12) United States Patent
Tinkler et al.

(10) Patent No.: US 9,295,357 B2
(45) Date of Patent: Mar. 29, 2016

(54) APPARATUS FOR CUP AND CARAFE BEVERAGE PRODUCTION

(71) Applicant: Keurig Green Mountain, Inc., Waterbury, VT (US)

(72) Inventors: Ian Tinkler, Wakefield, MA (US); James E. Shepard, Marblehead, MA (US); Geoffrey Y. Smith, Melrose, MA (US); Peter Thomas Launie, Jr., Worcester, MA (US); Jonathan Alexander Brodie, North Billerica, MA (US); Stuart Jay Foster, Somerville, MA (US); Stoyan Plamenov Hristov, Billerica, MA (US); Jianming Huang, Andover, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 108 days.

(21) Appl. No.: 14/158,057

(22) Filed: Jan. 17, 2014

(65) Prior Publication Data

US 2015/0201791 A1  Jul. 23, 2015

(51) Int. Cl.
| | |
|---|---|
| *A47J 31/40* | (2006.01) |
| *B65D 85/804* | (2006.01) |
| *A47J 31/46* | (2006.01) |
| *A47J 31/44* | (2006.01) |
| *A23F 3/18* | (2006.01) |
| *A23F 5/26* | (2006.01) |

(Continued)

(52) U.S. Cl.
CPC ................. *A47J 31/407* (2013.01); *A23F 3/18* (2013.01); *A23F 5/262* (2013.01); *A47J 31/0673* (2013.01); *A47J 31/3695* (2013.01); *A47J 31/4492* (2013.01); *A47J 31/46* (2013.01); *B65D 85/8043* (2013.01)

(58) Field of Classification Search
CPC ..... A47J 31/407; A47J 31/46; A47J 31/3695; A47J 31/0673; A47J 31/4492; A23F 3/18; A23F 5/262; B65D 85/8043; B65D 2565/385
See application file for complete search history.

(56) References Cited

U.S. PATENT DOCUMENTS

| | | |
|---|---|---|
| 7,325,479 B2 | 2/2008 | Laigneau et al. |
| 7,569,243 B2 | 8/2009 | Yoakim et al. |
| 8,361,527 B2 | 1/2013 | Winkler et al. |

(Continued)

FOREIGN PATENT DOCUMENTS

| | | |
|---|---|---|
| WO | WO 2013/119495 A1 | 8/2013 |
| WO | WO 2013/192625 A1 | 12/2013 |

OTHER PUBLICATIONS

International Search Report and Written Opinion from International Application No. PCT/US2015/011503 dated Mar. 17, 2015.

*Primary Examiner* — Anthony Weier
(74) *Attorney, Agent, or Firm* — Wolf, Greenfield & Sacks, P.C.

(57) ABSTRACT

Method and apparatus for forming both carafe quantities and smaller (e.g., cup) quantities of a beverage using a cartridge-based beverage machine. A beverage forming machine accommodates cartridges having different sizes and/or shapes, including different rim sizes/shapes. The outlet used for receiving a beverage from a standard cartridge differs from the outlet used for receiving the beverage from a carafe cartridge inserted in a same cartridge holder. Beverage may exit the cartridge in an upward direction in some embodiments.

20 Claims, 13 Drawing Sheets

(51) Int. Cl.
    *A47J 31/06*     (2006.01)
    *A47J 31/36*     (2006.01)

(56) References Cited

U.S. PATENT DOCUMENTS

| | | | |
|---|---|---|---|
| 8,516,948 B2 | 8/2013 | Zimmerman et al. | |
| 8,573,114 B2 | 11/2013 | Huang et al. | |
| 2011/0100228 A1 | 5/2011 | Rivera | |
| 2012/0058226 A1 | 3/2012 | Winkler et al. | |
| 2013/0340626 A1* | 12/2013 | Oh | B65D 85/8043 99/295 |
| 2013/0344205 A1* | 12/2013 | Oh | B65D 85/8043 426/232 |
| 2015/0064324 A1* | 3/2015 | Oh | B65D 85/8043 426/433 |
| 2015/0072049 A1* | 3/2015 | Oh | B65D 85/8043 426/87 |
| 2015/0079244 A1* | 3/2015 | Oh | B65D 85/8043 426/232 |
| 2015/0104550 A1* | 4/2015 | Oh | B65D 85/8043 426/231 |
| 2015/0201789 A1* | 7/2015 | Smith | A47J 31/407 99/295 |
| 2015/0201790 A1* | 7/2015 | Smith | A23F 3/18 426/431 |

* cited by examiner

APPARATUS FOR CUP AND CARAFE BEVERAGE PRODUCTION

BACKGROUND

1. Field of Invention

Aspects of the invention relate to a beverage forming systems to be used with cartridges to form beverages such as coffee.

2. Related Art

Beverage forming systems for use with beverage cartridges are well known, and typically include a cartridge holder for receiving a cartridge containing a beverage medium. The system delivers water and/or other fluid to the cartridge to interact with the beverage medium, and a beverage is received from the cartridge.

SUMMARY

Aspects of the invention provide for a beverage forming apparatus which forms beverages in both a small quantity and a substantially larger quantity suitable for a carafe of beverage. For example, in some embodiments, a beverage forming system machine includes a cartridge holder which can accommodate either a standard cartridge which holds sufficient beverage medium to form a cup of coffee, or, separately, a carafe cartridge which contains enough beverage medium to form a carafe of coffee. Various features of the beverage forming machine may permit a user to easily brew or otherwise form beverages in vastly different volumes without significant action beyond choosing a cartridge and inserting the cartridge into the machine.

In one aspect, a beverage forming apparatus includes a cartridge holder having an opening to receive a cartridge, the cartridge holder arranged to receive a first cartridge of a first cartridge type in the opening and a second cartridge of a second cartridge type in the opening at separate times. The first cartridge is of a type configured to hold an amount of beverage medium to form a volume of a beverage of eight ounces or less, and the second cartridge is of a type configured to hold an amount of beverage medium sufficient to form a volume of at least thirty ounces of the beverage. The apparatus includes an inlet arranged to provide liquid to a cartridge held by the cartridge holder to form the beverage, a first outlet arranged to receive the beverage from the first cartridge held by the cartridge holder, and a second outlet, different from the first outlet, arranged to receive the beverage from the second cartridge held by the cartridge holder.

In one embodiment, a beverage forming apparatus includes a cartridge holder having an opening to receive a first cartridge of a first cartridge type and a second cartridge of a second cartridge type at separate times. The first cartridge is of a type configured to hold an amount of beverage medium to form a volume of a beverage of eight ounces or less, and the second cartridge is of a type configured to hold an amount of beverage medium sufficient to form a volume of at least thirty ounces of the beverage. The cartridge holder is arranged to engage with a cartridge support region of each of a first cartridge held by the cartridge holder and a second cartridge held by the cartridge holder, the support region of the first cartridge having a different size and/or shape than the support region of the second cartridge. The apparatus also includes a liquid supply system arranged to provide a liquid for combination with a beverage medium in a cartridge held by the cartridge holder to form a beverage.

In some embodiments, a beverage forming apparatus includes a cartridge holder having an opening to receive a cartridge, an inlet arranged to provide liquid to the cartridge held by the cartridge holder to form a beverage, and an outlet arranged to receive the beverage from the cartridge held by the cartridge holder. The inlet is arranged to inject a liquid into the cartridge in the cartridge holder such that the liquid flow has a vertical component which travels downwardly in the direction of the force of gravity as the liquid enters the cartridge, and the outlet is arranged to receive the beverage from the cartridge in the cartridge holder such that the liquid flow has a vertical component which travels upwardly in a direction opposite to the force of gravity as the beverage exits the cartridge.

In some embodiments, a method of forming a beverage using a beverage forming apparatus is provided. The beverage forming apparatus includes a cartridge holder having an opening to receive a cartridge, a first outlet, and a second outlet that is different from the first outlet. The cartridge holder is arranged to receive a first cartridge of a first cartridge type in the opening and a second cartridge of a second cartridge type in the opening at separate times. The method includes providing a first cartridge into the opening of the cartridge holder, the first cartridge holding an amount of beverage medium to form a volume of a beverage of eight ounces or less. The method includes an act of combining liquid with the beverage medium in the first cartridge to form a beverage, receiving the beverage from the first cartridge via the first outlet, and removing the first cartridge from the opening of the cartridge holder. Further included in the method is providing a second cartridge into the opening of the cartridge holder, the second cartridge holding an amount of the beverage medium to form a volume of the beverage of thirty ounces or more, combining liquid with the beverage medium in the second cartridge to form the beverage, and receiving the beverage from the second cartridge via the second outlet.

In some embodiments, a method of forming a beverage using a beverage forming apparatus is provided. The beverage forming apparatus includes a cartridge holder having an opening to receive a cartridge, the cartridge holder arranged to receive a first cartridge of a first cartridge type in the opening and a second cartridge of a second cartridge type in the opening at separate times. The method includes providing a first cartridge having a first cartridge support region into the opening of the cartridge holder such that the cartridge holder supports the first cartridge at the first cartridge support region, the first cartridge holding an amount of beverage medium to form a volume of a beverage of eight ounces or less, and having a first cartridge support region. The method also includes combining liquid with the beverage medium in the first cartridge to form a beverage, removing the first cartridge from the opening of the cartridge holder, and providing a second cartridge having a second cartridge support region into the opening of the cartridge holder such that the cartridge holder supports the second cartridge at the second cartridge support region. The second cartridge holds an amount of beverage medium to form a volume of a beverage of thirty ounces or more, and the second cartridge support region has a different size and/or shape than the first cartridge support region. Further included in the method is combining liquid with the beverage medium in the second cartridge to form the beverage.

In further embodiments, a method of forming a beverage using a beverage forming apparatus is provided. The beverage forming apparatus includes a cartridge holder having an opening to receive a cartridge. The method includes using an inlet to provide liquid to a cartridge held by the cartridge holder to form a beverage, and using an outlet to receive the beverage from the cartridge held by the cartridge holder. The liquid is injected into the cartridge in the cartridge holder such that the liquid flow has a vertical component which travels downwardly in the direction of the force of gravity as the liquid enters the cartridge, and the beverage is received from the cartridge in the cartridge holder such that the liquid flow has a vertical component which travels upwardly in a direction opposite to the force of gravity as the beverage exits the cartridge.

These and other aspects of the disclosure will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
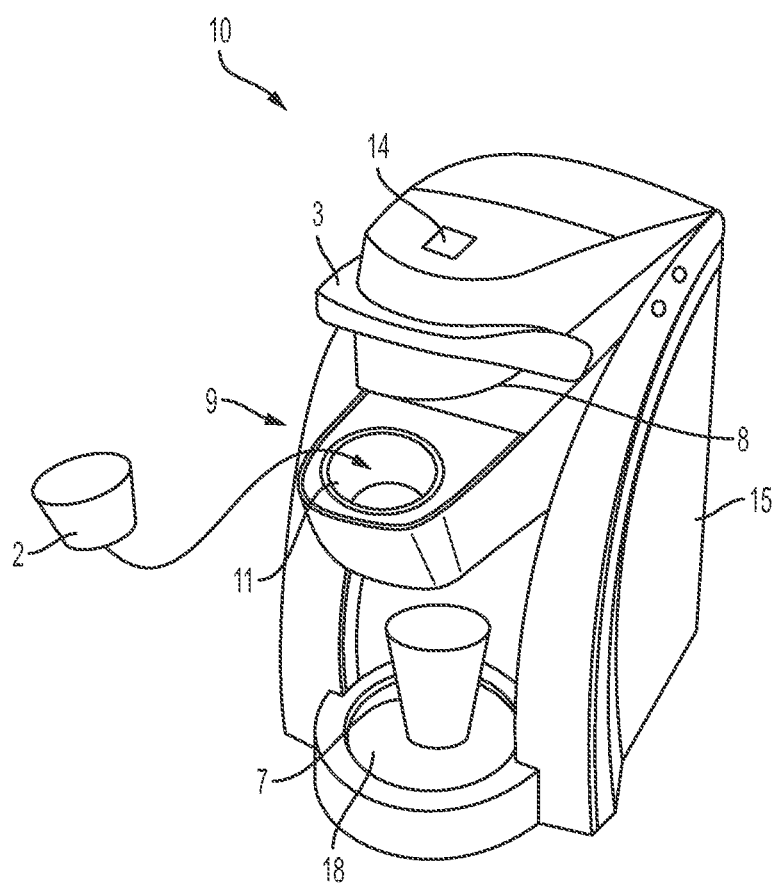
FIG. 1 is a front, perspective view of a beverage forming apparatus with a cartridge holder in an open position in an illustrative embodiment.

FIG. 1 shows a perspective view of a beverage forming system 10. Although the beverage forming system 10 may be used to form any suitable beverage, such as tea, coffee, or other infusion-type beverages, beverages may be formed from a liquid or powdered concentrate, soups, juices or other beverages made from dried materials, or other materials. As is known in the art, a beverage cartridge 2 may be provided to the system 10 and used to form a beverage that is deposited into a user's cup. The cartridge 2 may be manually or automatically placed in a cartridge receiver that includes a cartridge holder 9 and a cover 8 in this embodiment of the beverage forming system 10. For example, the holder 9 may be or include a circular, cup-shaped or otherwise suitably-shaped opening 11 in which the cartridge 2 may be placed. While in this embodiment the opening 11 is sized and shaped so as to engage with an upper portion of the cartridge 2, the opening 11 may be arranged in other ways, e.g., to engage with a lower portion, side, bottom or other part of the cartridge 2. With a cartridge 2 placed in the cartridge holder 9, a handle 3 may be moved by hand so as to move the cartridge holder 9 to a closed position. In the closed position, the cover 8 at least partially covers the opening 11, e.g., to at least partially enclose the cartridge 2 in a chamber in which the cartridge is used to make a beverage. For example, with the cartridge 2 held by the cartridge holder 9 in the closed position, water or other liquid may be provided to the cartridge 2 (e.g., by injecting the liquid into the cartridge interior) to form a beverage that exits the cartridge 2 and is provided to a cup or other container.

Cartridges for use with beverage forming machines are well known, and may include one or more filters as well as a beverage medium, such as ground coffee beans, tea leaves, etc. In some cartridges, the filter is located between two or more portions of an interior space of the cartridge, e.g., one portion in which a beverage medium is located, and a second portion into which liquid may flow after having passed through the filter. Examples of such cartridges are disclosed in U.S. Pat. No. 5,840,189 and/or U.S. Pat. No. 6,607,762. U.S. Pat. No. 8,361,527 describes a cartridge and a system for introducing liquid into the cartridge that may be used in embodiments of this invention, and is hereby incorporated by reference in its entirety.

In this embodiment, the beverage forming machine 10 includes a housing 15 that houses and/or supports components of the machine 10, such as a user interface 14 used to control system operation, and defines a container receiving area 18 at which a container 7 is positionable to receive beverage dispensed by the machine 10. Thus, at the container receiving area 18, the container 7 is associated with the machine 10 to receive a dispensed beverage and may be supported by the housing 15. The container 7 may be received at the container receiving area 18 so that the container 7 is at least partially surrounded by the housing 15, or the container 7 may be more exposed when at the container receiving area 12.

In accordance with one aspect of the invention, the beverage forming machine accommodates either a smaller cartridge suitable to produce a smaller quantity of beverage (hereinafter, "standard cartridge") or a larger cartridge suitable for preparation of a larger volume of beverage such as a carafe of beverage (hereinafter, "carafe cartridge"). For example, the cartridge holder may be configured to receive and hold a cartridge containing an amount of beverage medium suitable to form a smaller quantity of beverage, for example, between 5 oz. and 16 oz. The same cartridge holder also may be configured to receive and hold, at a different time from holding a standard cartridge, a carafe cartridge containing an amount of beverage medium sufficient to form a substantially larger quantity of beverage, for example 30 oz. or more. In this manner, a cartridge-based machine may be used to form a smaller beverage serving and a larger beverage quantity sufficient for multiple servings, e.g., a carafe of coffee. As a result of being able to receive and hold either type of cartridge in the same cartridge holder, operation is simple from the user's standpoint. In some embodiments, the cartridge holder may be configured to receive and hold a cartridge containing an amount of beverage medium suitable to form 8 oz. or less of beverage, and also configured to receive and hold a cartridge containing an amount of beverage medium suitable to form 30 oz. or more of the beverage. The cartridge holder may be configured to receive and hold a cartridge containing an amount of beverage medium suitable to form 48 oz. or more, or 60 oz. or more of the beverage in some embodiments.

In another aspect of the invention, a beverage forming system may be configured to use a different inlet port and/or outlet port depending on the type of cartridge being used. For example, when a standard cartridge is used, the machine may use a needle or other penetrating element to pierce a lid at the top of the cartridge to form an inlet port, and a separate needle to pierce the bottom of the cartridge to form an outlet port. In the same machine, and even in the same cartridge holder, the machine may pierce a carafe cartridge at a different location and/or with a different needle (or other penetrating element). For example, the machine may pierce the lid of the carafe cartridge in some embodiments to form an outlet port. In such an embodiment, the beverage forming system may be configured to inject fluid downwardly into a beverage cartridge, and arranged to receive the formed beverage as the beverage flows upwardly out of the cartridge. Arrangements such as those described above may allow various cartridges having different flow paths, substantially different sizes, and different piercing locations to be used in the same cartridge holder.

Another aspect of the invention relates to a beverage machine which accommodates a standard cartridge having a rim size that is different from the rim size of a carafe cartridge. In some embodiments, the machine adjusts an engagement portion based on the type of cartridge present. Other embodiments may include a separate engagement portion for cartridges of each type. Such an arrangement may make for an easy and convenient way to use a single beverage forming machine to produce cups of coffee and also carafes of coffee.

The beverage machine receives cartridges of different shapes and/or cartridges having rims of different shapes according to another aspect of the invention in some embodiments. An adjustable engagement portion is used in some embodiments to accommodate either a carafe cartridge having a first shape or a standard cartridge having a second shape. A sensor may sense which cartridge shape is present as part of determining which cartridge type has been inserted in the cartridge holder and/or as part of engaging the cartridge. In some embodiments, the adjustable engagement portion includes a deformable material or element.

In accordance with another aspect of the invention, the feature and/or location of the cartridge by which the cartridge is held in the cartridge holder may be different for a standard cartridge as compared to a carafe cartridge. For example, the rim of one type of cartridge may be used by the cartridge holder as a cartridge support region, while the cartridge holder may use the bottom or sides of another type of cartridge as a cartridge support region.

One arrangement for using a cartridge to form a beverage will now be described with reference to FIG. B. The cartridge 2 shown in the embodiment of FIG. 2 includes a container 12 which includes an interior space 14 having a first chamber 14a and a second chamber 14b that are separated by a filter 30. It should be understood, however, that other additional chambers in the interior space and/or sub-portions or areas of the first and second chambers, may be provided in other embodiments. For example, it is possible for the cartridge to have three spaces that separated by two filters (e.g., a first filter separates two portions of a first chamber and a second filter separates the first and second chambers), and so on. In another embodiment, the first or second chamber may be separated into two portions by a venturi or other feature that introduces air into a beverage. Thus, the first and/or second chambers may be divided or otherwise separated into two or more portions or areas by filters, walls, dividers, passageways, and other features.

In this embodiment, the container 12 may have a frusto-conical cup shape with a sidewall 17 and an opening 13. However, in other embodiments, the container 12 may have a fluted, conical, or cylindrical shape, may be in the form of a square or rectangular cup, a domed cup, a sphere or partial sphere, or other suitable form, may have a fluted, corrugated, or otherwise shaped sidewall, and so on. Also, the container 12 need not necessarily have a defined shape, as is the case with some beverage sachets and pods. For example, although the container 12 in this embodiment has a relatively rigid and/or resilient construction so that the container 12 tends to maintain its shape, the container 12 could be made to have a more compliant and/or deformable arrangement, e.g., like a sachet container made from a sheet of deformable material. Thus, an interior space defined by the container 12 may be formed only after the container material is formed around a beverage medium, filter and/or other cartridge components, similar to when two filter paper layers (container material) are joined together around a charge of coffee grounds to form a pod or other form of cartridge.

If the container 12 includes an opening, the opening may be closed by a lid 38, e.g., a foil and polymer laminate material that is attached to a rim 19 of the container 12. Although in this embodiment the rim 19 is arranged as an annular flange-like element, the rim 19 may be arranged in other ways. For example, the rim 19 may be the top edge of the sidewall 17 without any flange element. The container 12 and/or the lid 38 may provide a barrier to moisture and/or gases, such as oxygen. For example, the container 12 may be made of a polymer laminate, e.g., formed from a sheet including a layer of polystyrene or polypropylene and a layer of EVOH and/or other barrier material, such as a metallic foil. Such an arrangement may provide suitable protection for the beverage medium 20, e.g., from unwanted exposure from moisture, oxygen and/or other materials. It should be understood, however, that the container 12 and/or the lid 38 may be made of other materials or combinations of materials, such as biopolymers, compostable polymers, paper, foils, etc.

Figure 2:
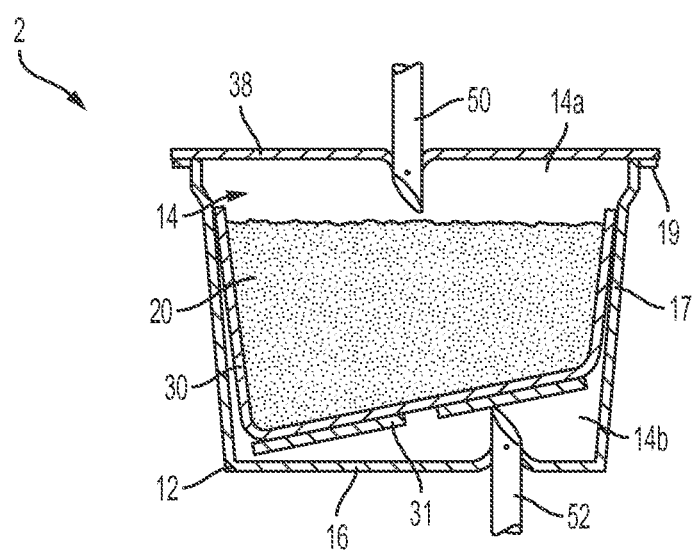
FIG. 2 is a cross-sectional side view of a beverage cartridge in an illustrative embodiment.

The lid 38 and/or the container 12 may be pierced to introduce liquid into the cartridge and receive beverage from the cartridge. As used herein, "beverage" refers to a liquid substance intended for drinking that is formed when a liquid interacts with a beverage medium. Thus, beverage refers to a liquid that is ready for consumption, e.g., a liquid dispensed into a cup and ready for drinking, as well as a liquid that will undergo other processes or treatments, such as filtering or the addition of flavorings, creamer, sweeteners, another beverage, etc., before being consumed. To introduce liquid into the cartridge, for example, as shown in FIG. 2, a portion of the lid 38 generally circumscribed by the periphery 32 may be pierced by an inlet port 50 (e.g., a hollow needle) or other penetrating element so that water or other liquid or fluid may be injected into the cartridge 2. Other inlet piercing arrangements are possible, such as multiple needles, a shower head, a non-hollow needle, a cone, a pyramid, a knife, a blade, etc. A beverage machine that uses the cartridge may include multiple piercing elements of the same type or of different types.

In another arrangement, a beverage machine may include a piercing element (such as a spike) that forms an opening and thereafter a second inlet element (such as a tube) may pass through the formed hole to introduce liquid into (or conduct liquid out of) the container. In other embodiments, the lid 38 may be pierced, or otherwise effectively opened for flow, by introducing pressure at an exterior of the lid 38. For example, a water inlet may be pressed and sealed to the lid 38 exterior and water pressure introduced at the site. The water pressure may cause the lid 38 to be pierced or otherwise opened to allow flow into the cartridge 2. In another arrangement, the lid 38 may include a valve, conduit or other structure that opens when exposed to a suitable pressure and/or when mated with a water inlet tube or other structure.

The cartridge 2 may be penetrated by an outlet port 52 (e.g., a hollow needle) at a bottom 16 of the container 12, or at a second portion of the lid 38 outside of the periphery 32 and apart from the inlet opening. As with the inlet piercing arrangement, the outlet piercing arrangement may be varied in any suitable way. Thus, the outlet piercing element may include one or more hollow or solid needles, knives, blades, tubes, and so on. Alternately, the cartridge 2 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although one may be used, e.g., to allow the valve or other element to open. Also, in this illustrative embodiment, the piercing element remains in place to receive beverage as it exits the opening formed in the container 12 or lid 38. However, in other embodiments, the piercing element may withdraw after forming an opening, allowing beverage to exit the opening and be received without the piercing element being extended into the cartridge 2. The outlet piercing element may include or be connected to a conduit to conduct beverage from the cartridge 2 to a dispensing area of the beverage forming machine 10, or beverage may simply exit the cartridge 2 without being conducted by a conduit.

Figure 3:
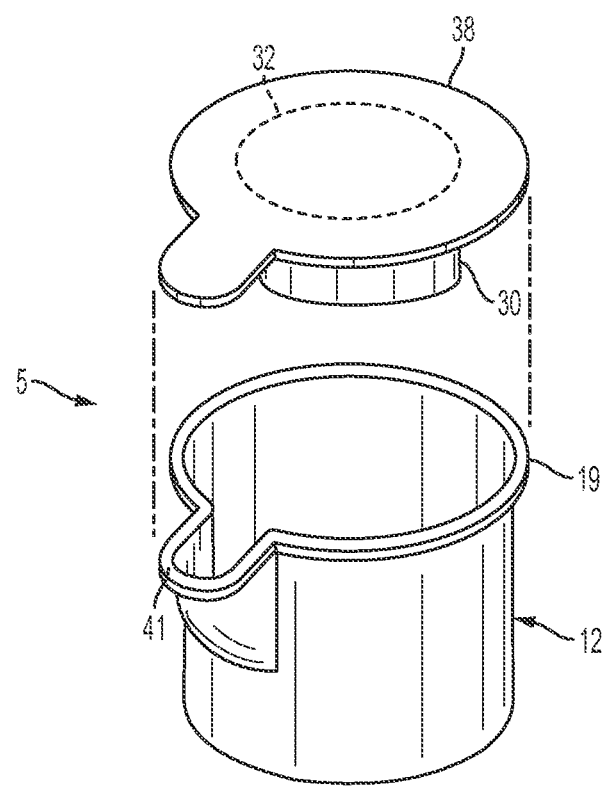
FIG. 3 is a perspective exploded view of a beverage cartridge in an illustrative embodiment.

FIG. 3 shows an embodiment of a cartridge 5 having a rim 19 and container 12 that form a cup shape having a spout-like feature 41. The lid 38 may have a corresponding shape, and may be arranged so that an outlet opening can be formed in the lid 38 in the spout area of the rim 19 and container 12. This shape may help with draining of beverage from the container 12 when the cartridge is suitably oriented because the beverage may tend to drain into the spout area. In such an embodiment, a piercing element may arranged to pierce the lid in the spout region as part of forming a cartridge outlet.

The spout feature or other irregular shape also may provide an indexing or positioning feature that helps to ensure that the cartridge 5 is associated with a beverage machine in a particular way. For example, the cartridge shown in FIG. 3 may be used in an orientation where the spout feature is located at or near the outlet needle. Because the spout can be used to ensure that the cartridge is positioned with the spout at or near the outlet needle, the spout can help in draining beverage from the cartridge.

The filter 30 may be attached to the lid 38 at a periphery 32 that is spaced inwardly and away from the rim 19. Or, in some embodiments, the filter 30 may be attached directly to the container 12 or other suitable feature.

Using the spout or other indexing feature to ensure a suitable cartridge orientation also may help if the cartridge 5 includes readable features, such as a barcode, RFID tag, or other machine readable code. That is, the spout may help ensure the cartridge is rotationally positioned in a particular location so that the readable feature(s) can be properly read by the machine. The spout feature (or other suitable arrangement) also may provide a convenient place for a pull tab to be located for the lid 38 so that the lid 38 and filter 30 may be removed from the rim 19, e.g., by peeling the lid 38 from the rim 19.

The beverage machine may include two or more outlet ports, and the determination as to which outlet port is used may be based on the size and/or type of cartridge being used. For example, when using a carafe cartridge to form a beverage, an outlet port that pierces the lid of the cartridge may be used, while an outlet port that pierces the bottom of the cartridge (or other location below the lid) may be used to pierce a standard cartridge. Or, in some embodiments, the arrangement may be reversed.

For example, when using a standard cartridge, the inlet port 50 may be used to penetrate the lid 38 and inject liquid into the cartridge 2, and the outlet port 52 may be used to penetrate the container bottom 16 and deliver beverage from the cartridge, as shown in FIG. 2. When a carafe cartridge is placed in the cartridge holder, the same inlet port 50 may be used, but a different outlet port 54 may be used for delivery of beverage from the cartridge. In the embodiment shown in FIG. 4, the outlet port 54 penetrates the lid 38 to form an outlet, though the beverage forming machine and the cartridge may be arranged to form an outlet at any suitable location. In embodiments where one or more of the cartridge outlets are openings which do not include hollow needles or tubes, different outlet openings may be used for different cartridge types.

Figure 4:
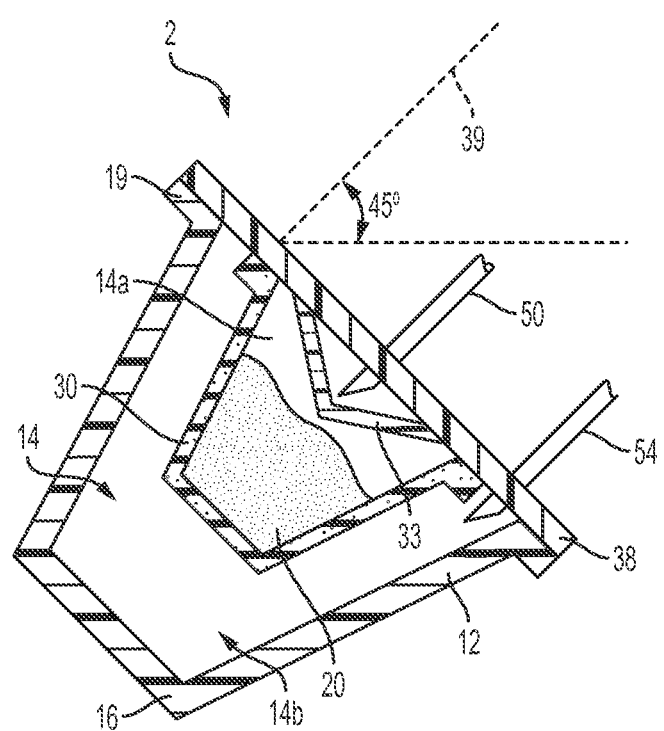
FIG. 4 is a cross-sectional side view of a beverage cartridge in an illustrative embodiment.

FIG. 4 shows the cartridge 2 tilted such that an imaginary axis 39 perpendicular to the lid is at an angle relative to horizontal. In the illustrated embodiment, the cartridge is tilted by 45° relative to horizontal, though any suitable angle may be used, and the cartridge may be used in a non-tilted, vertical orientation in some embodiments. In some embodiments, the cartridge may be inverted relative to horizontal such that the lid 38 faces either straight downwardly or downwardly at an angle.

In the arrangement shown in FIG. 4, the beverage which exits the cartridge through the outlet port 54 has an upward component of movement. Via the pressure of the liquid injected into the cartridge 2 and/or the pressure of an air purge operation, the beverage moves upwardly against the force of gravity and out of the cartridge 2. That is, when the liquid is injected into the cartridge, the liquid flow has a vertical component which aligns with gravity (even if the downward flow is not directly vertically downward), and when the beverage exits the cartridge, the liquid flow has a vertical component which is opposite to the gravitational force.

Figure 5:
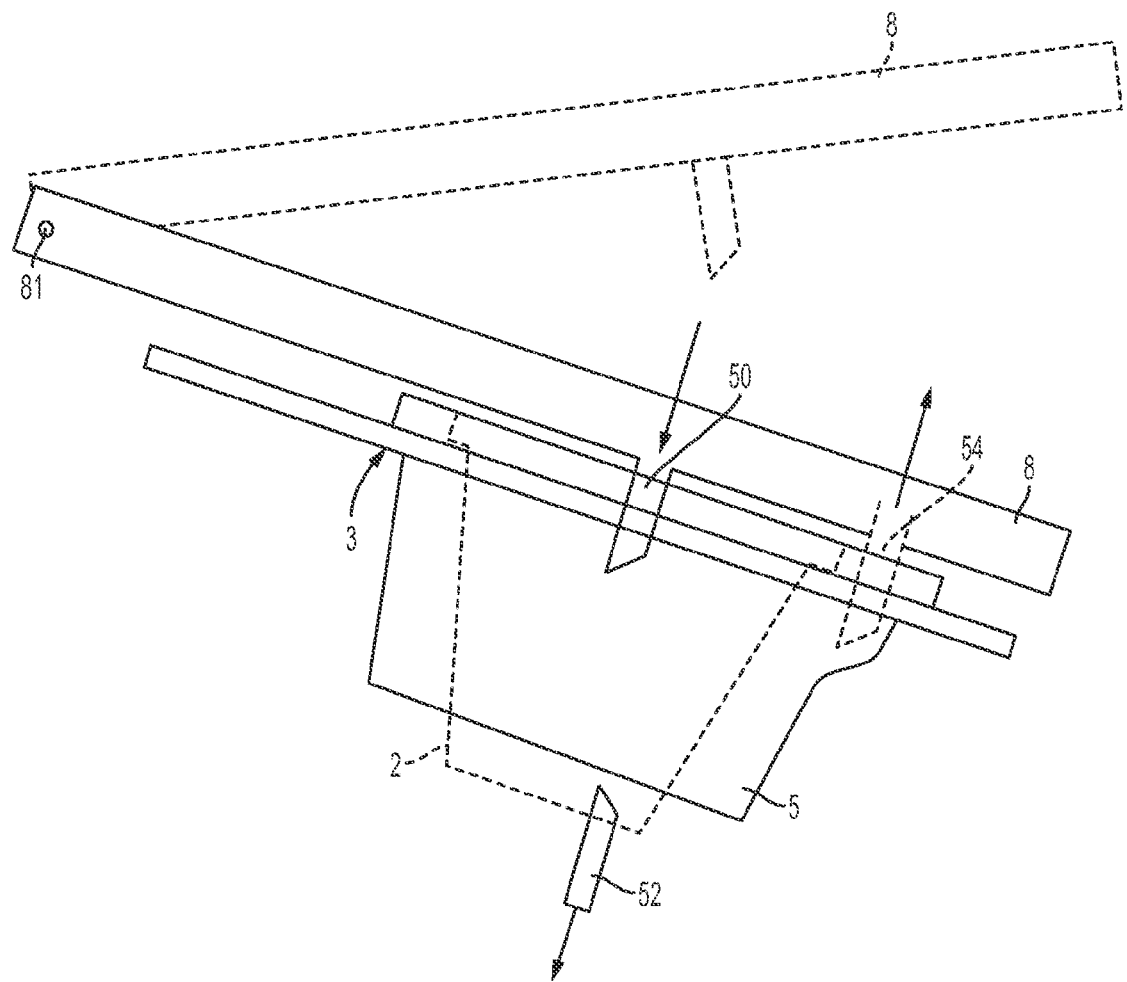
FIG. 5 is a schematic side view of a cartridge holder and a cover in an illustrative embodiment.

FIG. 5 shows a schematic side view of an inlet and outlet port configuration that may be employed with embodiments disclosed herein where a cartridge holder is arranged to receive cartridges of different sizes and/or shapes. As can be seen in FIG. 5, the cover 8 of the beverage machine 10 may include a first inlet port 50 and a second outlet port 54, and may be pivotal about a cover pivot 81 between an open position (shown in dashed line) and a closed position (shown in solid line). In this embodiment, the inlet and outlet ports 50, 54 include piercing elements to pierce the cartridge 5 and form an opening, but piercing elements for either or both ports are not required. Instead, the cartridge 5 may have pre-formed inlet/outlet openings, or the openings may be formed by pressure applied to the outside or inside of the cartridge. For example, water pressure may be applied to the exterior of the cartridge 5 to form an inlet opening, and beverage pressure inside the cartridge may form an outlet opening in the cartridge, e.g., a septum, burstable seal or other structure may open in response to pressure.

In this embodiment, when a carafe cartridge 5 is received into the cartridge holder 9 and the cover 8 is moved to the closed position, the inlet and outlet ports 50, 54 may form openings in a top of the cartridge 5 so that water or other fluid may be provided into the cartridge 5 via the inlet port 50, and beverage may be received from the cartridge 5 via the outlet port 54. However, the second outlet port 52 does not contact the carafe cartridge 5 because the cartridge 5 is not tall enough to reach downwardly and contact the second outlet port 52. In contrast, when the standard cartridge 2 is received in the cartridge holder 9, the inlet port 50 may form an opening in a top of the cartridge 2 when the cover 8 is in the closed position, but the first outlet port 54 does not penetrate the standard cartridge 2 because the cartridge 2 is smaller in diameter at the rim 19. Instead, the second outlet port 52 may form an outlet opening in a bottom of the cartridge 2 because in this embodiment, the standard cartridge 2 is taller than the carafe cartridge 5 so that the piercing element of the outlet port 52 penetrates the cartridge 2. Thus, beverage formed in the cartridge 2 may flow to the second outlet port 52. Of course, it will be understood that other inlet/outlet port arrangements are possible for use with different cartridges and are not limited to this illustrative embodiment. For example, the inlet and/or outlet ports may introduce or receive fluid in any suitable locations relative to the cartridges, such as at the top, bottom, side or other locations of the cartridge, and may depend on the cartridge arrangements.

Note that while in the embodiment shown in FIG. 5, the carafe cartridge 5 is too short to contact the second outlet port 52, a different arrangement may not require a height difference between cartridge types. In such a case, the second outlet port 52 may be moved out of a cartridge receiving space so that the port 52 can avoid contact with the cartridge 5. Such movement may be accomplished in different ways, such as by a motorized drive, a linkage, having a user physically move one of the ports into/out of a cartridge receiving area, and others. In one aspect of the invention, one or more ports may be selected for use with a cartridge based on one or more features of the cartridge that is inserted into the cartridge holder 9. For example, insertion of a cartridge having a relatively larger rim diameter may cause the second outlet port 52 to be moved out of a cartridge receiving area so as to avoid potential contact with the cartridge. In other embodiments, insertion of a particular cartridge type may release a port for movement, e.g., insertion of the larger rim cartridge may release the second outlet port 52 so that the cartridge may contact the second outlet port 52 and move it.

Of course, other embodiments, such as one in which the cover 8 does not include piercing elements, but rather inlet and/or outlet ports that are flush with the cover surface confronting the cartridge, the cover 8 need not move. Instead, the cover may remain fixed and stationary relative to the housing 17 and the cartridge holder 9 may move alone, e.g., the cartridge holder 9 could pivot from an upper position to a lower position in which the opening 11 is opposed to the fixed cover. Thereafter, the holder 9 could move radially or linearly so that the cover at least partially covers the opening 11.

To receive and support different types of cartridge, including different sizes and/or shapes of cartridges, a cartridge holder may include an adjustable engagement portion which engages with each type of cartridge. By way of example, the cartridge holder may include an engagement portion which moves or is biased horizontally to position a cartridge in the holder. Such an arrangement could accommodate differently-sized and/or differently-shaped cartridges while using the same portion or portions of the cartridge holder to support each type of cartridge.

Figure 6:
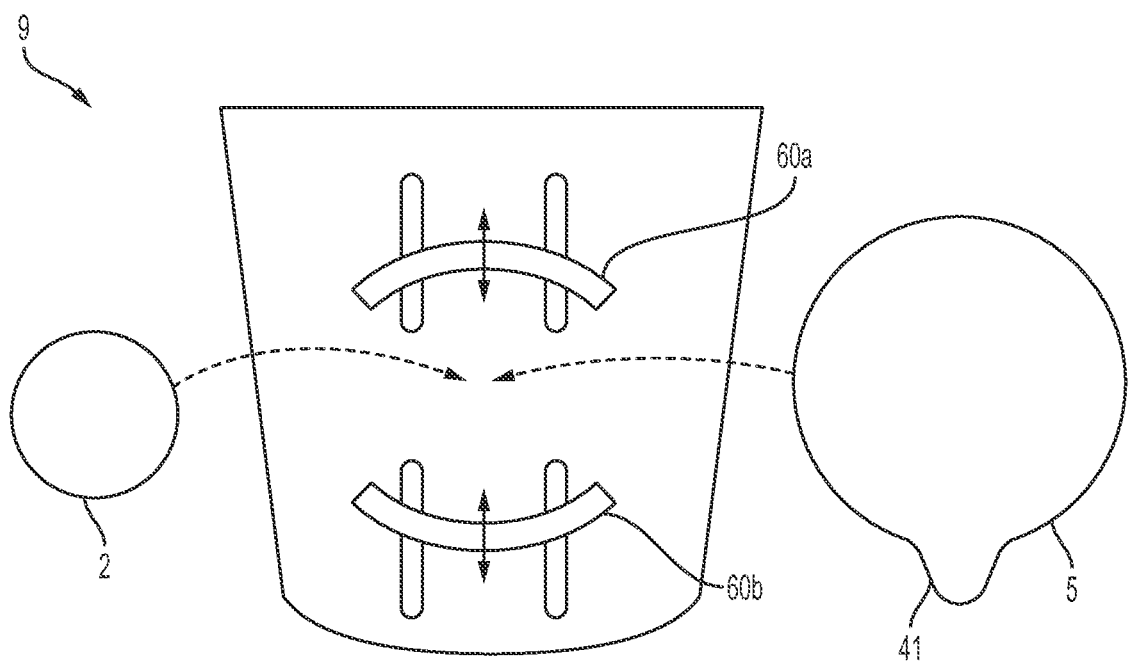
FIG. 6 is a top view of a cartridge holder and two beverage cartridges in an illustrative embodiment.

For example, as shown in the top view of one embodiment of a cartridge brewer in FIG. 6, a cartridge holder may include movable cartridge supports 60*a* and 60*b*. When a standard cartridge having a first rim size is sensed by the machine, for example the cartridge 2 of FIG. 5, the cartridge supports 60*a*, 60*b* may be moved inwardly toward one another to capture the cartridge 2. In some embodiments, the supports 60*a*, 60*b* may be moved a preset distance, while in other embodiments, the supports 60*a*, 60*b* may be arranged so that they move inwardly until a threshold force is encountered, indicating that cartridge is present.

Similarly, when a carafe cartridge 5 having a larger rim size than the standard cartridge 2 is inserted into the cartridge holder 9, the machine may sense the cartridge's presence in any suitable manner and move the supports 60*a*, 60*b* inwardly until the cartridge is captured. As before, the machine may determine what type of cartridge is present, and control the supports 60*a*, 60*b* accordingly.

The supports 60*a*, 60*b* may automatically return to a fully separated configuration when the cartridge is removed from the cartridge holder 9 in some embodiments so that the cartridge holder 9 is ready to receive a new cartridge. Or, the machine may be configured such that the user moves the supports 60*a*, 60*b* apart from one another when inserting a new cartridge. For example, in some embodiments, the supports 60*a*, 60*b* may be biased inwardly, such as by one or more springs, such that the cartridge is pushed into the cartridge holder opening 11 to force the supports apart from one another.

As another example of an adjustable engagement portion, a block of resilient material may be provided with an opening sized such that a standard cartridge is pressable into the opening and held via an interference fit. The resilient material may be sufficiently flexible such that a carafe cartridge similarly can be pressed into the opening and held by the resilient material.

Figure 7:
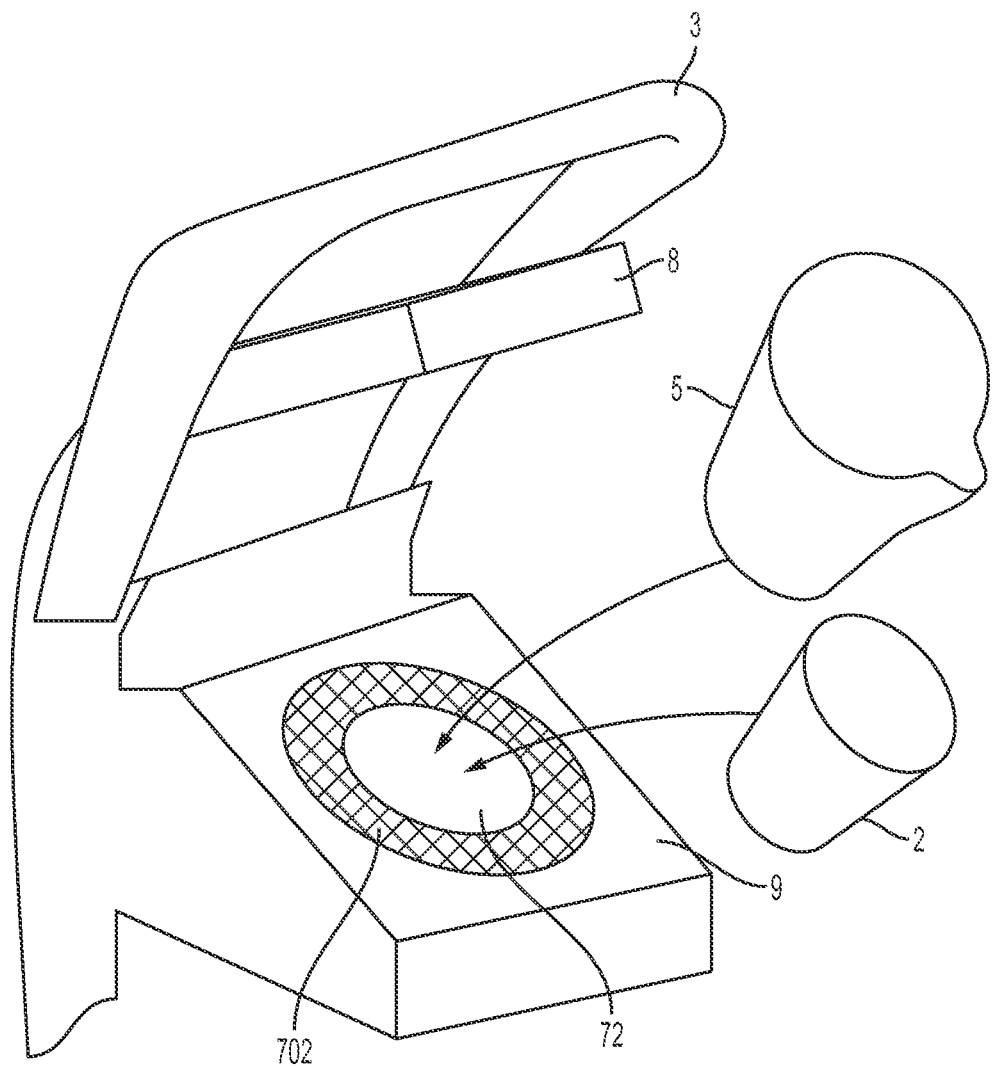
FIG. 7 is a partial, cutaway, front perspective view of a cartridge holder in an illustrative embodiment.

FIG. 7 shows a partial view of a cartridge holder 9 including a block of resilient material 70 with an opening 72 arranged to receive cartridges of varying sizes and/or shapes, such as the carafe cartridge 5 or the standard cartridge 2. Each cartridge compresses the resilient material, and the resulting inward force from the material holds the cartridge in place. The opening 72 may be sized to hold a suitable range of cartridge sizes such that standard cartridges and carafe cartridges can be accommodated. The resilient material may be made of a foam or silicone material in some embodiments. With certain shapes of cartridges, such as frustoconical cartridges for example, the opening in the resilient material adjusts as the cartridge is inserted into the opening.

Figure 8:
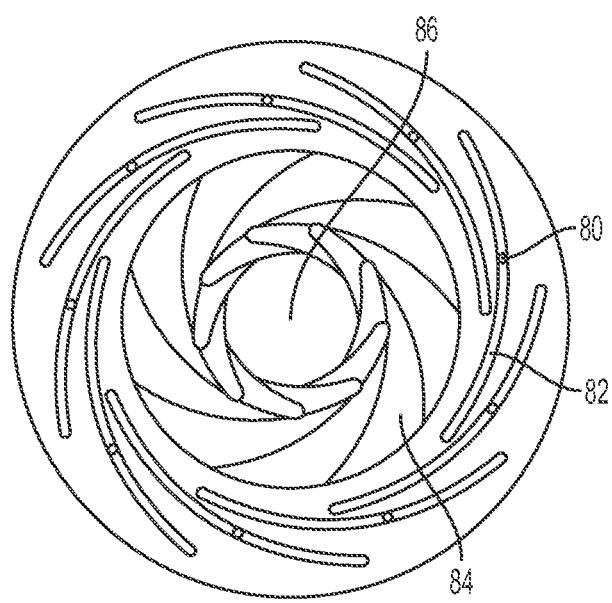
FIG. 8 is a partial, cutaway, top view of a cartridge holder in an illustrative embodiment.

In a further embodiment, an arrangement similar to an iris diaphragm shutter may be used to position and/or hold a cartridge. Multiple blades may move inwardly to close a substantially circular opening until coming the blades come into contact with the cartridge that is present in the holder. FIG. 8 shows one arrangement of such an embodiment, with a plurality of pins 80 in slots 82 to move panels 84 inwardly and outwardly to adjust the size of an opening 86. In this manner, the cartridge holder may work with a continuous range of cartridge sizes, and not be limited to certain, discrete cartridge sizes.

Figure 9:
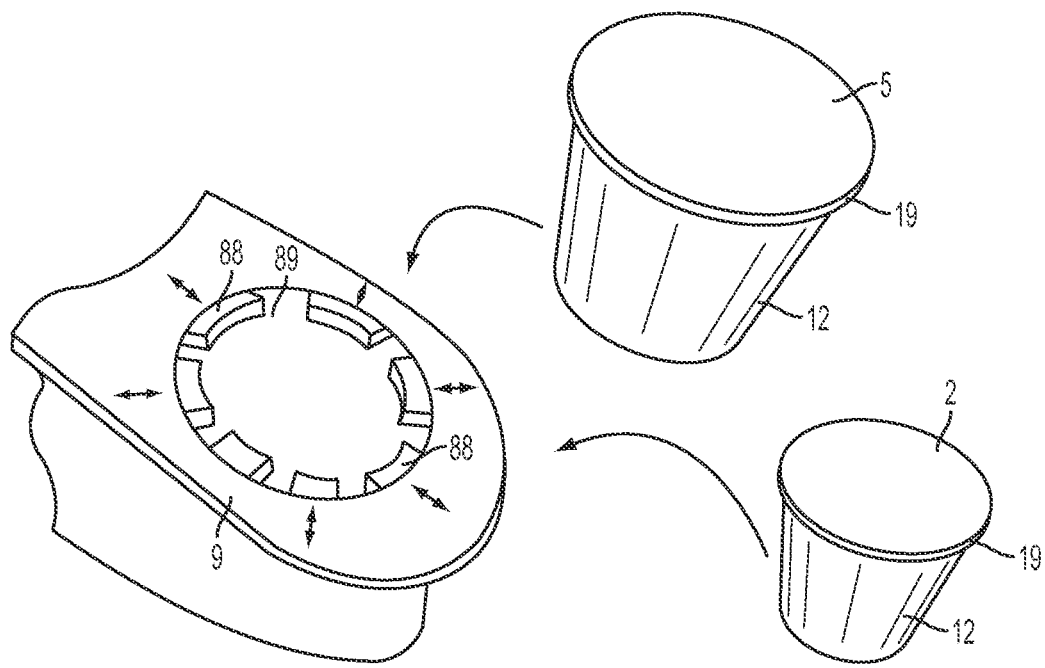
FIG. 9 is a perspective side view of a cartridge holder arranged to receive cartridges having different sizes in an illustrative embodiment.

In another embodiment, the cartridge holder 9 may include one or more moveable portions 88 that are movable to adjust a size of an opening 89 at which the cartridges are received and engaged by the cartridge holder 9, as shown in FIG. 9. For example, in this embodiment, the cartridge holder 9 is arranged to receive both a carafe cartridge 5 and a standard cartridge 2 that are different from each other, e.g., the carafe cartridge 5 has a circular rim 19 with a diameter that is larger than the diameter of the circular rim 19 of the standard cartridge 2. The sizes of the rim diameters and the difference between the two may be any suitable value, e.g., one rim 19 may have diameter of about 50 mm and the other rim 19 diameter may be about 63 mm. In some embodiments, the rim diameter of a cartridge may be 75 mm or more. The rim 19 diameter is relevant in this embodiment because the cartridge holder 9 engages with the cartridges 2, 5 in a region at or near (e.g., just below) the rim 19. For example, the cartridge may be received into the opening 89 such that an underside of the rim 19 rests on the movable portions 88 and the cartridge is suspended by its rim. In cases where the cartridges 2, 5 are engaged by the holder 9 in other regions, such as at a midsection of the cartridges 2, 5, at a bottom of the cartridges, etc., the cartridges 2, 5 may be different in size and/or shape in these regions. For cartridges that include a spout which forms part of the rim, the diameter of the rim does not include the spout portion.

In this embodiment, the movable portions 88 are movable in a radial direction as shown by the arrows so that the size of the opening 89 can be adjusted to receive the differently-sized cartridges 2, 5. The movable portions 88 may move in any suitable way, such as being spring biased to move radially inwardly so that when the first and/or second cartridge 2, 5 is placed in the holder 9, the movable portions 88 are pushed outwardly by the cartridge 2, 5 container 12 until the rim 19 contacts the movable portions 88 or other stop. In the embodiment shown in FIG. 9, each of the movable portions 88 may be slidable in a corresponding slot of the cartridge holder 9, and a coil spring (not shown) may bias each of the movable portions 88 to move radially inwardly in the corresponding slot. A stop or other feature may limit each movable portion's 88 radial movement, e.g., the movable portions 88 may be normally biased to a position in which the movable portions 88 define a size and/or shape of the opening 89 that corresponds to the standard cartridge 2. Thus, when the standard cartridge 2 is placed in the holder 9, the movable portions 88 need not move to allow the holder to receive the second cartridge 2. However, the movable portions 88 may move radially to accept the carafe cartridge 5.

Figure 10:
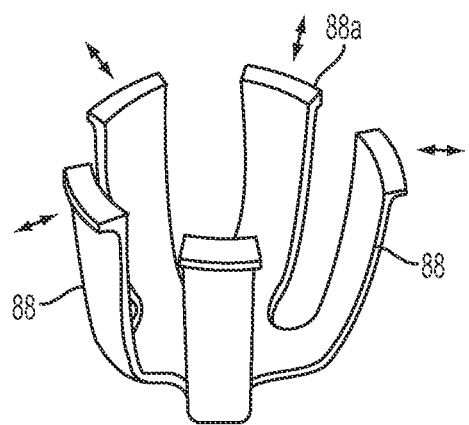
FIG. 10 is a perspective side view of an engagement portion for the cartridge holder of the FIG. 9 embodiment.

In another embodiment, an engagement portion of the cartridge holder may include one or more "finger" or wall portions that are arranged to move to accommodate differently sized/shaped cartridges. For example, FIG. 10 shows one embodiment of an engagement portion that includes five "fingers" or wall portions 88. The wall portions 88 are arranged together to form a sort of basket in which the cartridges are placed. Thus, the structure shown in FIG. 10 may be positioned in the cartridge holder 9 such that top parts 88a of the wall portions 88 define the opening 89 of the holder 9, e.g., the top parts 88a may contact an underside of the rim 19 of the cartridges. The wall portions 88 may be joined together at a bottom of the engagement portion and include at least one resilient portion that allows the wall portions 88 to flex outwardly and/or inwardly so as to adjust a size and/or shape of the opening 89. For example, with the wall portions 88 at rest in an undeformed state, the standard cartridge 2 may be received into the opening 89 defined by the wall portions 88 with little or no movement of the wall portions 88. However, when the larger carafe cartridge 5 is placed in the opening 89, the sidewall 12 of the cartridge 5 may force the wall portions 88 to flex outwardly until the underside of the rim 19 contacts the top parts 88a of the wall portions 88.

In some embodiments, the engagement portion(s) may have a contact area which contacts a standard cartridge, and the same contact area also contacts a carafe cartridge when carafe cartridge is provided to the cartridge holder. For example, the top parts 88a of the wall portions 88 are contact areas that contact both the standard cartridge and the carafe cartridge in some embodiments.

The machine may determine which type of cartridge (large/small, spout/no-spout, etc.) is present in any suitable manner. In some embodiments, the machine includes a sensor which sends a signal to a controller based on which type of cartridge is present, and the controller, such as a microprocessor, controls operation of the appropriate inlet and/or outlet ports. For purposes herein, when an action or decision is based on a determination or other parameter, the term "based on" does not necessarily limit the action to being based on only that specific parameter. Other parameters may factor into the action or decision. However, in some embodiments described herein, certain actions may be based solely on one parameter. For example, an action of adjusting a cartridge holder opening size may be based solely on the type of cartridge sensed by a sensor in some embodiments.

In other embodiments, no sensor is used—instead the physical arrangement of the outlet ports and the cartridges permits one type of cartridge to be pierced from below (e.g., a standard cartridge) without being pierced at its top lid, and allows another type of cartridge to be pierced at its top lid (e.g., a carafe cartridge) without being pierced from below, as discussed above with reference to FIG. 5. In some embodiments, a sensor may be employed simply to determine whether a cartridge is present, but not to determine a type of cartridge. For example, when used with the embodiment described above where one or more engagement portions move inwardly until encountering a threshold force, a cartridge presence sensor may be used as part of instructing the engagement portions to start moving inwardly.

The sensor may sense a physical characteristic of the cartridge. For example, a mechanical sensor may sense the presence of a spout 41 (or lack thereof), or the size of a cartridge rim. A sensor which senses a label or other identifying element included with the cartridge may be used instead of, or in addition to, a mechanical sensor. For example, a UPC or RFID reader may be used to detect which type of cartridge is present, e.g., standard cartridge versus carafe cartridge.

Figure 11:
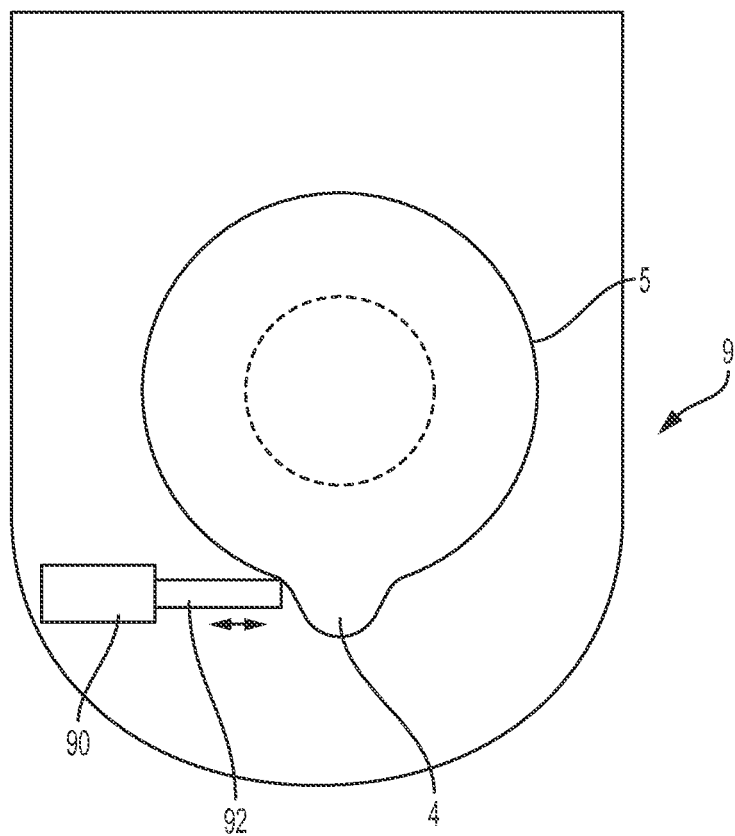
FIG. 11 is a partial, cutaway, top view of a cartridge holder including a cartridge sensor in an illustrative embodiment.

As one example of a mechanical sensor, FIG. 11 is a schematic top view of a cartridge holder 9 holding a carafe cartridge 5 with a spout 41. A first cartridge sensor (not shown) may check for the presence of a cartridge once the cover is closed over the cartridge holder 9. If a cartridge is sensed, a second cartridge sensor 90 extends a movable sensor bar 92 toward a region of the cartridge holder where a spout would be present if a carafe cartridge is inserted. If the sensor bar 92 hits a spout before reaching full extension, the sensor sends a signal to a controller to signal that a carafe cartridge is present, and the controller proceeds to send an appropriate amount of water or other fluid to the cartridge.

In some embodiments, the user interface may include a prompt for the user to indicate what type of cartridge is being provided to the cartridge holder. In such embodiments, the beverage forming machine may additionally include a cartridge sensor to determine the presence of a cartridge and/or to confirm the indication, or may not include any sensor.

Figure 12:
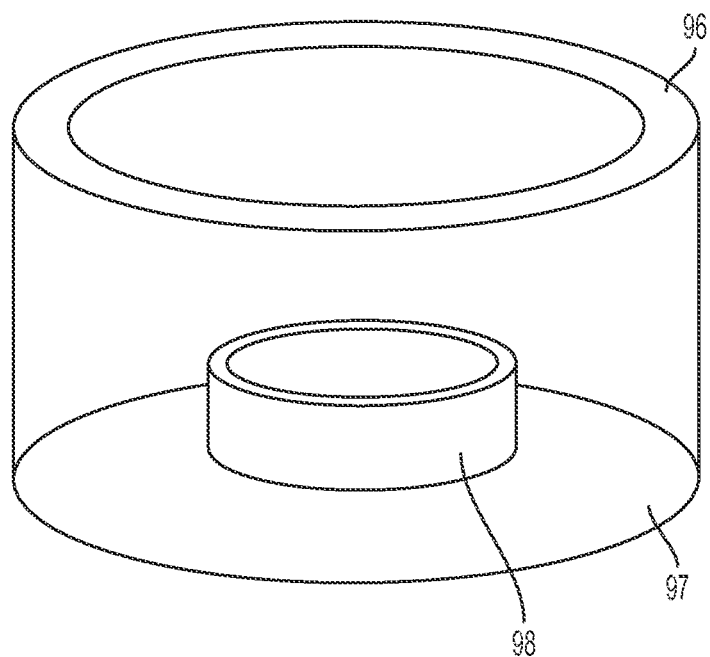
FIG. 12 is a perspective, top view of cartridge engagement portions of a cartridge holder in an illustrative embodiment.

According to one aspect of the invention, a beverage-forming machine may be constructed to hold a standard cartridge at a different location and/or by contacting a different cartridge feature as compared to a carafe cartridge. Two different holding elements may be provided in the machine—one for holding the standard cartridge and one for holding the carafe cartridge in some embodiments. For example, as shown schematically in FIG. 12, the cartridge holder 9 may support the larger carafe cartridge by the cartridge rim on an upper edge of an outer support cylinder 96. The same cartridge holder may be arranged to support a standard cartridge (of the same height or different height) at the cartridge's bottom using a base 97 of the cartridge holder, and include a low profile cylinder 98 (or other riser) to prevent horizontal movement of the cartridge. The carafe cartridge may be shaped with a raised bottom so that the carafe cartridge does not interfere with the low profile cylinder 98. In other embodiments, the standard cartridge is held at or near its rim, while the carafe cartridge is held at a different cartridge support region.

Figure 13:
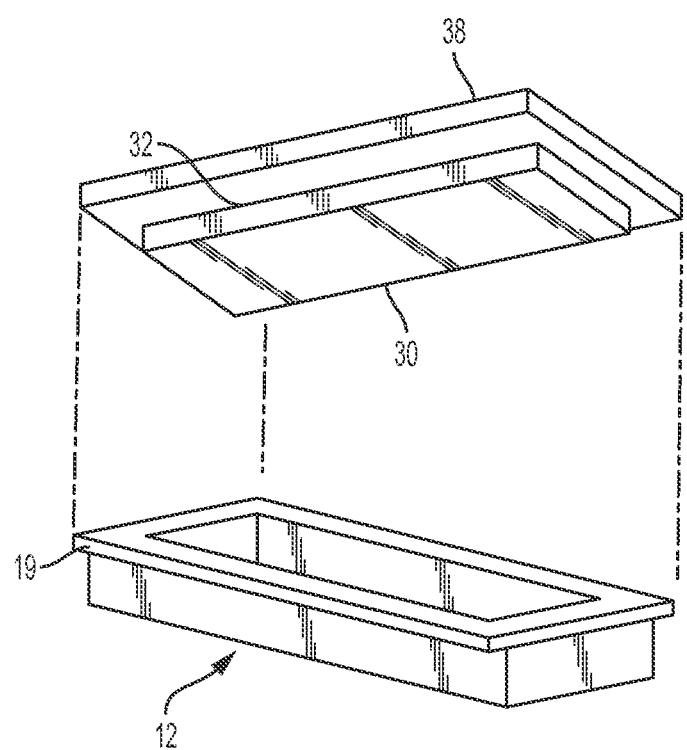
FIG. 13 is a perspective exploded view of a beverage cartridge in an illustrative embodiment.

While various embodiments of cartridges are described above, other cartridge types may be used. For example, cartridges such as those described in U.S. Pat. Nos. 6,607,762, 6,645,537, 6,538,577, and others may be used. FIG. 13 shows one example of a non-circular cartridge which may be used in connection with embodiments disclosed herein. In this embodiment, the container 12 is shaped like a rectangular box and has a rectangularly-shaped rim 19. The lid 38 and filter 30 (which also has a rectangular box shape) are attached to the rim 19 in a way similar to that described above. This embodiment illustrates that aspects of the invention are not limited to round or circular shapes for the rim 19 and/or other cartridge components. To the contrary, any irregular or other suitable shape for the cartridge components is possible.

Figure 14:
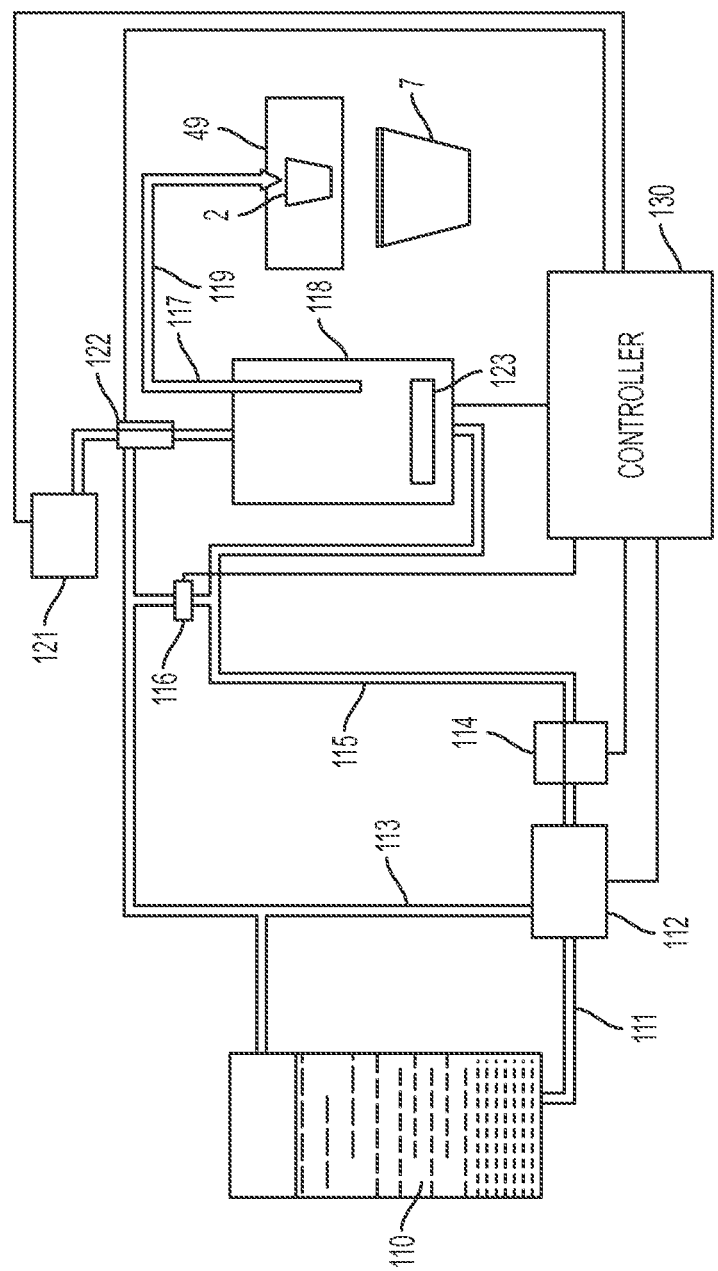
FIG. 14 is a schematic diagram of components of a beverage forming system in an illustrative embodiment.

FIG. 14 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. Water or other liquid from a storage tank 110 may be provided via a supply conduit 111 to a pump 112 (such as a centrifugal pump, piston pump, solenoid pump, diaphragm pump, etc.), which pumps the liquid via a pump conduit 115 to a heating tank or chamber 118. Operation of the water pump 112 and other components of the apparatus 100 may be controlled by a controller 130, e.g., including a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions. The heating tank 118 may be filled with a desired amount of liquid by any suitable technique, such as running the pump 112 for a predetermined time, sensing a water level in the heating tank 118 using a conductive probe sensor or capacitive sensor, detecting a pressure rise in heating tank 118 when the liquid fills the tank, or using any other viable technique. For example, the controller 130 may detect that the heating tank 118 is completely filled when a pressure sensor detects a rise in pressure indicating that the water has reached the top of the heating tank 118. Alternately, the controller 130 may not detect whether the tank 118 is filled or not, and simply assume that the tank 118 is filled once a first fill operation is completed.

Water in the tank may be heated, if desired, by way of a heating element 123 whose operation is controlled by the controller 130 using input from a temperature sensor or other suitable input. Water in the heating tank 118 may be dispensed via a heating tank conduit 119 to the cartridge chamber 49 or other beverage forming station. Although in this embodiment the conduit 119 is shown extending below the top of the tank 118, the conduit 119 may be arranged in any suitable way, such as connected simply to the top of the tank 119 without extending into the tank at all. The cartridge chamber 49 may include any beverage making ingredient, such as ground coffee, tea, a flavored drink mix, or other substance, e.g., contained in a cartridge 2. Liquid may be discharged from the heating tank 118 by pressurizing the metering tank with air provided by an air pump 121 that causes the liquid to be discharged out of a tube 117 and into the heating tank conduit 119. Completion of the dispensing from the heating tank 118 may be detected in any suitable way, such as by detecting a pressure drop in the heating tank 118, by detecting a water level change in the heating tank 118, use of a flow meter, or using any other viable techniques. Liquid may alternately be discharged from the heating tank 118 by the pump 112 operating to force additional liquid into the tank 118, thereby displacing water out of the tank 118 and to the brew chamber. A flow sensor or other suitable device may be used to determine the amount of liquid delivered to the tank 118, and thus the amount of liquid delivered to the brew chamber. Alternately, the pump 112 may be a piston-type, diaphragm-type or other pump arranged such that a known volume of liquid may be delivered from the pump 112 to the tank 118, thus causing the same known volume to be delivered to the cartridge holder 9. Thus, a specified volume of liquid may be delivered to the cartridge holder 9 by operating the pump 112 to deliver the specified volume of liquid to the tank 118. Liquid may be introduced into the cartridge 1 at any suitable pressure, e.g., 1-2 psi or higher. Once liquid delivery by the pump 112 is complete, an air pump 121 may be operated to force air into the top of the tank 118 and/or into the conduit 119 to clear the conduit 119 and cartridge 1 of liquid, at least to some extent.

While in this illustrative embodiment, a liquid supply system arranged to provide liquid to a beverage forming chamber (the cartridge chamber 49) may include a heating tank 118, pump 112, storage tank 110 and other components, these components are not necessarily required. Instead, any suitable arrangement for providing liquid to a chamber may be employed, whether using gravity, a pump, air pressure or other motive force to move liquid. Also, it is not necessarily required that liquid be heated prior to being provided for mixing with a beverage medium. Instead, liquid may be provided for forming a beverage at any suitable temperature.

Also, there is no requirement that an inlet port and/or an outlet port pierce a cartridge to provide liquid to, or receive beverage from, a cartridge. Instead, communication with a cartridge may be performed using any suitable ports or other features.

Although in the embodiments above the cartridge holder and other movable portions are driven by hand, other arrangements are envisioned for various aspects of the invention. For example, a motorized actuator may be used to move the cartridge holder, rather than a manually-operated handle. A motorized actuator may cause relative motion of components in response to a push-button operation, completion of a beverage formation cycle, or other input or condition. Also, to the extent different movable components are linked together in some fashion, such linkages are not limited to engagement via a cam and cam follower or other configurations discussed above. Other arrangements are possible, such as a pair of gears or a rack and pinion engagement (including straight or curved rack configurations).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming apparatus comprising:
a cartridge holder having an opening to receive a cartridge, the cartridge holder arranged to receive a first cartridge of a first cartridge size in the opening and a second cartridge of a second cartridge size, different from the first cartridge size, in the opening at separate times, the first cartridge being configured to hold an amount of beverage medium to form a volume of a beverage of eight ounces or less, and the second cartridge being configured to hold an amount of beverage medium sufficient to form a volume of at least thirty ounces of the beverage;
an inlet arranged to provide liquid to a cartridge held by the cartridge holder to form the beverage;
a first outlet arranged to receive the beverage from the first cartridge held by the cartridge holder; and
a second outlet arranged to receive the beverage from the second cartridge held by the cartridge holder, the second outlet being different from the first outlet; wherein
the second outlet is arranged to receive the beverage from the second cartridge in the cartridge holder such that liquid flow of the beverage has a vertical component which travels upwardly in a direction opposite to the force of gravity as the beverage exits the second cartridge; and
the first outlet is arranged to receive the beverage from the first cartridge in the cartridge holder such that liquid flow of the beverage has a vertical component which travels downwardly in the direction of the force of gravity as the beverage exits the first cartridge.

2. A beverage forming apparatus as in claim 1, wherein the second outlet includes a penetrating element arranged to penetrate the second cartridge at a cartridge lid.

3. A beverage forming apparatus as in claim 2, wherein the first outlet includes a penetrating element arranged to penetrate the first cartridge at a location below a cartridge lid.

4. A beverage forming apparatus as in claim 3, wherein the penetrating element of the first outlet is arranged to pierce a bottom of the first cartridge.

5. A beverage forming apparatus as in claim 1, wherein the inlet, first outlet, and second outlet each include a piercing element to pierce a cartridge.

6. A beverage forming apparatus as in claim 5, wherein the piercing elements of the inlet and the second outlet face downwardly and the piercing element of the first outlet faces upwardly.

7. A beverage forming apparatus as in claim 1, wherein the cartridge holder is arranged to receive a first cartridge having a rim diameter of less than or equal to fifty millimeters, and also arranged to receive a second cartridge having a rim diameter of greater than or equal to sixty-three millimeters.

8. A beverage forming apparatus as in claim 5, in combination with the second cartridge.

9. A beverage forming apparatus as in claim 1, wherein the cartridge holder is arranged to receive a second cartridge configured to hold an amount of beverage medium sufficient to form a volume of at least forty-eight ounces of the beverage.

10. A beverage forming apparatus as in claim 1, wherein the cartridge holder comprises a cartridge receiving area, and the first outlet or the second outlet is movable into and out of the cartridge receiving area.

11. A beverage forming apparatus comprising:
a cartridge holder having an opening to receive a cartridge, the cartridge holder arranged to receive a first cartridge of a first cartridge size in the opening and a second cartridge of a second cartridge size, different from the first cartridge size, in the opening at separate times;
an inlet arranged to provide liquid to a cartridge held by the cartridge holder to form the beverage;
a first outlet arranged to receive the beverage from the first cartridge held by the cartridge holder; and
a second outlet arranged to receive the beverage from the second cartridge held by the cartridge holder, the second outlet being different from the first outlet; wherein
the second outlet is arranged to receive the beverage from the second cartridge in the cartridge holder such that liquid flow of the beverage has a vertical component which travels upwardly in a direction opposite to the force of gravity as the beverage exits the second cartridge; and
the first outlet is arranged to receive the beverage from the first cartridge in the cartridge holder such that liquid flow of the beverage has a vertical component which travels downwardly in the direction of the force of gravity as the beverage exits the first cartridge.

12. A beverage forming apparatus as in claim 11, wherein the second outlet includes a penetrating element arranged to penetrate the second cartridge at a cartridge lid.

13. A beverage forming apparatus as in claim 12, wherein the first outlet includes a penetrating element arranged to penetrate the first cartridge at a location below a cartridge lid.

14. A beverage forming apparatus as in claim 13, wherein the penetrating element of the first outlet is arranged to pierce a bottom of the first cartridge.

15. A beverage forming apparatus as in claim 11, wherein the inlet, first outlet, and second outlet each include a piercing element to pierce a cartridge.

16. A beverage forming apparatus as in claim 15, wherein the piercing elements of the inlet and the second outlet face downwardly and the piercing element of the first outlet faces upwardly.

17. A beverage forming apparatus as in claim 11, wherein the cartridge holder is arranged to receive a first cartridge having a rim diameter of less than or equal to fifty millimeters, and also arranged to receive a second cartridge having a rim diameter of greater than or equal to sixty-three millimeters.

18. A beverage forming apparatus as in claim 15, in combination with the second cartridge.

19. A beverage forming apparatus as in claim 11, wherein the cartridge holder is arranged to receive a second cartridge configured to hold an amount of beverage medium sufficient to form a volume of at least forty-eight ounces of the beverage.

20. A beverage forming apparatus as in claim 11, wherein the cartridge holder comprises a cartridge receiving area, and the first outlet or the second outlet is movable into and out of the cartridge receiving area.

* * * * *